United States Patent [19]

Tozer

[11] Patent Number: 4,597,596
[45] Date of Patent: Jul. 1, 1986

[54] CYLINDER END SEAL

[75] Inventor: Michael J. C. Tozer, Stocksfield, England

[73] Assignee: Heat Transfer Technology Limited, St. Helier, Channel Islands

[21] Appl. No.: 668,936

[22] Filed: Nov. 7, 1984

[51] Int. Cl.⁴ .............................................. F16L 55/00
[52] U.S. Cl. .................................... 285/187; 285/55; 285/94; 285/233; 285/345; 285/422; 285/424; 285/917; 277/26; 277/236
[58] Field of Search ............... 285/187, 233, 424, 110, 285/34.5, DIG. 18, 55, 94, 422; 277/236, 26

[56] References Cited

U.S. PATENT DOCUMENTS

| | | | |
|---|---|---|---|
| 1,840,312 | 1/1932 | Dunmire | 277/236 |
| 2,405,152 | 8/1946 | Kilchenmann | 285/DIG. 18 X |
| 2,774,618 | 12/1956 | Alderson | 277/236 X |
| 4,054,306 | 10/1977 | Sadoff et al. | 285/233 |
| 4,071,269 | 1/1978 | Halling et al. | 285/DIG. 18 |

FOREIGN PATENT DOCUMENTS

| | | | |
|---|---|---|---|
| 969210 | 6/1975 | Canada | 277/236 |
| 81/00748 | 3/1981 | World Int. Prop. O. | 285/110 |
| 123373 | 2/1919 | United Kingdom | 285/110 |

Primary Examiner—Dave W. Arola
Attorney, Agent, or Firm—Hubbard, Thurman, Turner & Tucker

[57] ABSTRACT

For sealing the joint between a pipe end (2) and a pipe or housing (3) into which it is to be inserted, a metal sleeve (1) has a part (a) which is secured, such as by welding, to the pipe end (2), a first annular corrugation (b) and a second annular corrugation (c) which is of greater diameter than the first annular corrugation (b) and resiliently deformable into sealing engagement with the pipe or housing (3).

10 Claims, 5 Drawing Figures

CYLINDER END SEAL

This invention relates to the formation of sealed joints between the ends of metal cylinders, for instance pipes or solid or tubular shafts and tubular or hollow housings concentric therewith.

Particularly in air flow pipe systems on aircraft engines, and other installations which in operation become heated, the pipes are subject to thermal expansion and contraction and allowance must be made for pipe movement accordingly. This is sometimes done by means of curved or bellows sections in the pipe but it is preferred not to use this expedient because it is not reliable in operation.

It has already been proposed also to equip a pipe end with external split ring fittings and insert it into a seal housing but these devices are unsatisfactory because they have an in-built leak path associated with the split; moreover they do not tolerate angular misalignment.

The present invention has accordingly been devised with the object of permitting a cylinder end joint which can tolerate linear displacement and angular misalignment under varying conditions without leakage.

Thus in accordance with the invention there is provided a cylinder end sealing sleeve made of metal and attachable co-axially over the outside of a cylinder end, the sleeve comprising, successively along its length a constant diameter section which is in contact with the cylinder and secured thereto; a first radially outwardly projecting annular corrugation and a second radially outwardly projecting annular corrugation which is of increased diameter and axial length compared with the first one and intended to deform into sealing engagement with a housing or tube in which the cylinder end is to be sealingly inserted.

The sleeve is made of high quality sheet metal because it must operate at high temperatures and still retain its strength and elasticity. A preferred material is a high nickel content alloy known as NIMONIC 80A (BS HR 201) the sleeve being made in one piece with no weld in its construction.

The sealing sleeve can be attached to the cylinder by welding and can be coated with a wear-resistant lubricant to ensure long life.

The dimensions of the sealing sleeve are such as to achieve an interference fit and provide a satisfactory fluid—i.e. liquid or gas-seal even when the cylinder axis is at a slight angle to the axis of the seal housing.

The sealing part of the sleeve, that is to say the endmost corrugation, is so dimensional as to undergo deformation when inserted into a seal housing and create hoop stresses which react to alter the shape of the seal when undergoing angular departure from axial alignment to maintain a continuous sealing contact line.

The first corrugation being of a reduced diameter does not perform a sealing function. It acts however in the manner of a single convolution of a bellows and provides essential additional flexibility in the sealing sleeve by accommodating the movement which occurs on installation and allowing the sealing corrugation to maintain external contact with the external housing or tube.

A preferred embodiment of the sealing sleeve is illustrated in the accompanying drawing, in which.

Figure 1:
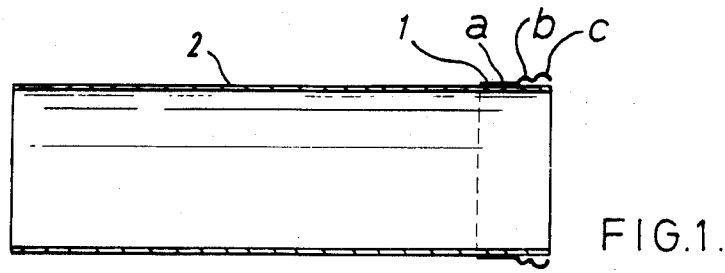
FIG. 1 is a central longitudinal section of the sealing sleeve shown in situ on a pipe end.
Figure 2:
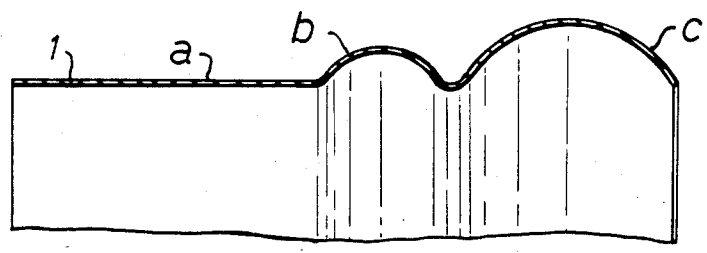
FIG. 2 is a radial longitudinal section through the sleeve.
Figure 3:
FIG. 3 is a longitudinal radial sketch view of the sleeve.

The sleeve 1 shown in the drawing is intended for fitting to the end of a metal pipe 2. It is made of NIMONIC 80A nickel alloy to BS HR 201 and has been fully age hardened after final forming by heat treatment in vacuum for 4 hours at 750° C.±10° C. The areas xxxx indicated in FIG. 3 are silver plated and the whole of the sleeve is polished.

The sleeve, which is of uniform material thickness from end to end, successively comprises, towards the extremity of the pipe end, a cylindrical constant diameter part a which is attached to the tube 2 by welding, a first radially outwardly projecting arcuate corrugation b and an adjoining larger radius corrugation c which is of greater diameter and axial length than the corrugation b.

Figure 4:
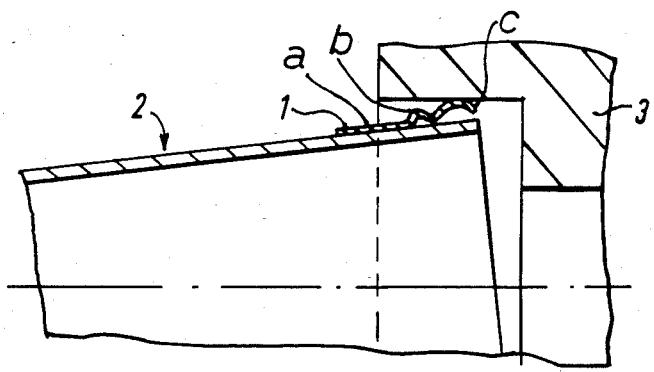
FIG. 4 is a longitudinal half section to illustrate the sleeve in an operative position within a housing.

Referring now to FIG. 4, where the pipe end with attached sleeve 1 has been pushed into the housing 3, it can be seen that the leading corrugation c has undergone deformation and, being resilient, is tightly engaging the inside wall surface of the housing 3 even though, as illustrated, the axis of the pipe 2 is inclined relative to the axis of the housing 3.

Typical dimensions of the embodiment which has been described and shown are as follows:

Outside Diameter of tube 2: 28 mm
Sleeve 1 thickness: 0.30 mm
Sleeve 1 inside diameter: 28.01 mm $\pm_{0.00}^{0.05}$
Sleeve 1 overall length: 11.09 mm
Sleeve 1 part a length: 5.25 mm
Sleeve 1 part b length: 1.9±0.25
Sleeve 1 part c length: 3.56±0.25
Sleeve 1 part b maximum diameter 29.6±0.13
Sleeve 1 part b minimum diameter 28.45±0.13
Sleeve 1 part c maximum diameter 30.61±0.05
Sleeve 1 part c minimum diameter 28.32±0.13

All these dimensions are prior to silver plating to a thickness of 0.025 to 0.050 mm.

Figure 5:
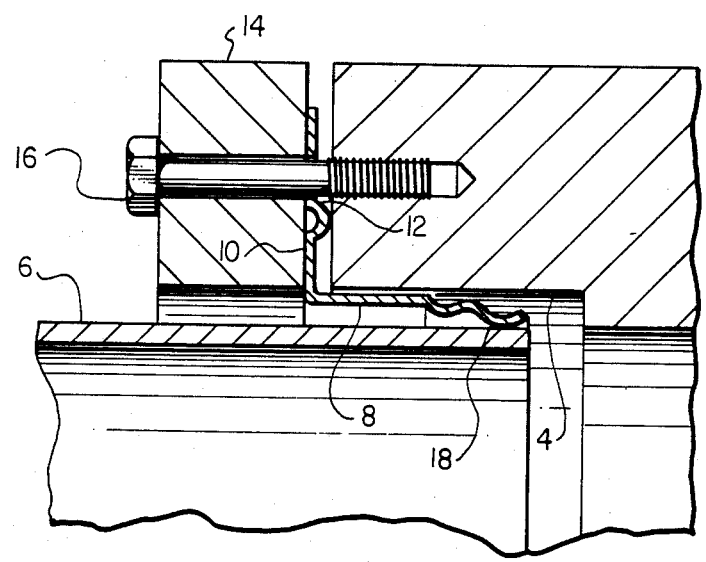
FIG. 5 is a longitudinal half-section to illustrate an alternative embodiment of the sleeve of the present invention.

Referring now to FIG. 5, a modified cylinder end sealing sleeve in accordance with the invention could be used to seal the joint between the annular body 4 of a valve or gearbox and so forth and the end of a pipe or shaft 6 extending therethrough where the body and/or the pipe or shaft contains a medium under some pressure such as oil, air or gas. The sleeve 8 would then have at its constant diameter end an annular radially outwardly directed end flange 10 formed with one or more axially projecting annular corrugations 12 and this flange 10 would be compressed between the body end 4 and a retaining plate 14 by tightening bolts 16 which extend through the retaining plate 14 into the body end 4. The resilient corrugation 18 of the sleeve 18 would then apply radially inwardly directed pressure against the pipe or shaft 6 end and provide an adequate seal even in the event of some axial misalignment of the pipe or shaft relative to the body.

I claim:

1. A cylinder end sealing sleeve made of metal and attachable co-axially over the outside of a cylinder and comprising successively along its length a constant diameter part intended to contact the cylinder wall and to be secured thereto; a first radially outwardly projecting annular corrugation and a second radially outwardly projecting annular corrugation which is of increased diameter and axial length compared with the first corrugation and intended to deform resiliently into sealing engagement with a housing or tube concentric therewith with said first radially outwardly projecting corrugation being spaced radially inwardly of said housing or tube and providing flexibility between said constant diameter part and said second corrugation.

2. A pipe end sealing sleeve made of metal and attachable co-axially over the outside of a pipe and comprising successively in the direction of the extremity of the pipe; a constant diameter part intended to contact the pipe end and to be secured thereto; a first radially outwardly projecting annular corrugation and a second radially outwardly projecting annular corrugation which is of increased diameter and axial length compared with the first corrugation and intended to deform resiliently into sealing engagement with a housing or pipe in which the pipe end is to be sealingly inserted with said first radially outwardly projecting corrugation being spaced radially inwardly of said housing or tube and providing flexibility between said constant diameter part and said second corrugation.

3. A pipe end sealing sleeve according to claim 2 in combination with a pipe end to which it is secured and a pipe or housing in which the pipe end and the sleeve are sealingly received.

4. A cylinder end sealing sleeve made of metal and attachable co-axially over the outside of a cylinder to form a seal between said cylinder and a housing, said sealing sleeve comprising successively along its length: a constant diameter part, a first radially projecting annular corrugation, and a second radially projecting annular corrugation intended to deform resiliently into sealing engagement with one of said housing or said pipe, with said first radially projecting corrugation having a diameter intermediate the respective diameters of said constant diameter part and said second radially projecting corrugation to provide flexibility between said constant diameter part and said second corrugation.

5. The cylinder end sealing sleeve according to claim 4 including at its constant diameter end an annular radially outwardly directed end flange formed with one or more axially projecting annular corrugations.

6. The cylinder end sealing sleeve according to claim 4, wherein said second corrugation is of increased axial length compared with said first corrugation.

7. The cylinder end sealing sleeve according to claim 4, wherein said first and second corrugations project radially outwardly with respect to said constant diameter part.

8. The cylinder end sealing sleeve according to claim 7, wherein said constant diameter part is intended to contact the wall of said cylinder and to be secured thereto.

9. The cylinder end sealing sleeve according to claim 4, wherein said first and second corrugations project radially inwardly with respect to said constant diameter part.

10. The cylinder end sealing sleeve according to claim 4, wherein said first and second corrugations are contiguous.

* * * * *